No. 857,726. PATENTED JUNE 25, 1907.
G. & A. DURIO & G. MARTINA.
METHOD OF MAKING LEATHER TIRES.
APPLICATION FILED FEB. 2, 1906.
2 SHEETS—SHEET 1.
Fig. 1.
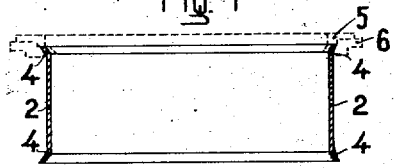
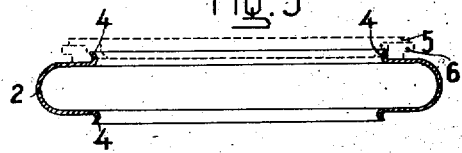
Fig. 6.
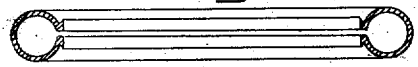
WITNESSES:
Fred White
Rene Bruine
INVENTORS:
Giacomo Durio,
Achille Durio and
Giovanni Martina,
By their Attorney
Arthur C. Fraser No. 857,726. PATENTED JUNE 25, 1907.
G. & A. DURIO & G. MARTINA.
METHOD OF MAKING LEATHER TIRES.
APPLICATION FILED FEB. 2, 1906.
2 SHEETS—SHEET 2.
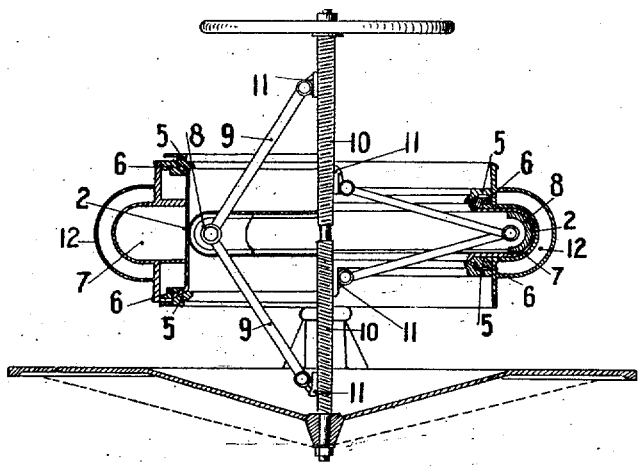
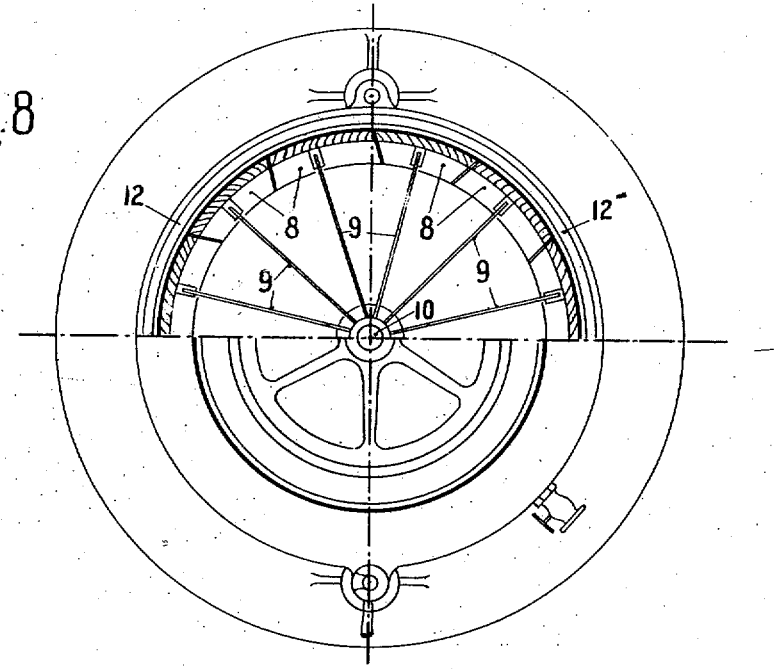
WITNESSES:
Fred White
Rene Muine
INVENTORS:
Giacomo Durio,
Achille Durio and
Giovanni Martina
By their Attorneys
Arthur C. Fraser Ueuia

UNITED STATES PATENT OFFICE.

GIACOMO DURIO, ACHILLE DURIO, AND GIOVANNI MARTINA, OF TURIN, ITALY.

METHOD OF MAKING LEATHER TIRES.

No. 857,726.          Specification of Letters Patent.          Patented June 25, 1907.

Application filed February 2, 1906. Serial No. 299,217.

*To all whom it may concern:*

Be it known that we, GIACOMO DURIO and ACHILLE DURIO, residing at Turin, Italy, Madonna di Campagna, and GIOVANNI MARTINA, residing at Turin, Italy, Via Buniva 23, all subjects of the King of Italy, have invented certain new and useful Improvements in Methods of Making Leather Tires, of which the following is a full, clear, and exact specification.

Attempts to substitute for the usual tires, which principally consist of india rubber, leather tires, have been made already in great numbers, and a long time ago. But they have failed to give proper practical results, for the reason that, in their making, it was not understood that they must have imparted to them the qualities of the usual tire with an india rubber base.

The object of the present invention is to produce a leather tire by a method of manufacture which differs entirely from those which have been used up to the present, by means of which a tire is produced which fulfils the requirements necessary in motor cars and similar vehicles.

The present invention is shown in the annexed drawings, in which

Figures 1 to 6 show the successive stages through which the material (*i. e.* the leather) passes before it assumes its final form, and Figs. 7 and 8 show in section and in plan an example of the apparatus employed in the process of manufacture.

In its general outlines the process of manufacture of the tires is as follows: A circular leather disk 1, of a quality which may be best suitable for the purpose, for instance leather tanned according to the chrome process, is taken and reduced by suitable machinery to the shape seen in Fig. 2, which shows the cylindrical rim 2 and the bottom 3. The bottom 3, which is not necessary, is then cut off, and the cylindrical rim alone remains, as shown in Fig. 3; the edges 4 of same are slightly turned over, as shown in Fig. 4, and the said edges are wedged in between rings or circular vises, and afterward the portion of the rim 2, which is comprised between the said edges 4 is forced outward by suitable apparatus thus reducing it approximately to the shape shown in Fig. 5. This shape is then, after a further process of modeling (carried out, for instance, on a mandrel) reduced to the final pattern, (which varies according to circumstances) one example of which is given in Fig. 6.

For the performance of the above mentioned operations, it is useful to employ the following machines or tools; for changing the circular disk of Fig. 1 to the shape of Fig. 2 an apparatus is adopted, which comprises a piston, moving forward under great pressure and entering a cylinder which has a slightly larger diameter according to the thickness of the leather, the diameter of the leather disk being of course larger than the diameter of the cylinder, and varying according to the size tire required. This disk is arranged in such a manner that it closes the mouth of the cylinder concentrically to it, and afterward the piston is made to enter the cylinder and, pursuing its stroke, it forces the leather disk to assume the shape indicated in Fig. 2. When the bottom 3 has been cut off, the edges 4 of the leather are inserted and tightly held between the rings 5 and 6 the latter being first placed on the outside of the edges. This being done, the piston is removed and the leather band 2, held between the rings 5 and 6, is placed in an apparatus (Fig. 7) comprising a part, external to said band 2, having a cavity 7 of the shape which the band is to take when it reaches the stage shown in Fig. 5. On the part of the apparatus which comes inside of the band 2 a segmental ring 8 is arranged in such a manner that, by impelling its segments outwardly, the diameter of the ring increases, and vice versa. These segments are of a shape corresponding with that of the cavity 7 and of a suitable size. These segments may be connected to each other in iris fashion, as in certain photographic shutter apparatus, or they may be simply alternated, so that one series is inside of the other when the diameter of the ring is less than the largest diameter which it may take, so that first the external series of segments are impelled outwardly, and when these have reached the largest diameter, the internal series are impelled outwardly and the segments composing it find their places between the alternately arranged segments previously moved outward.

For extending the segments a set of levers or toggle links 9 may be used, which are pivoted at one end on the segments and at the other upon collars 11, working upon screws with inverse threads 10, 10. The band 2 being arranged as mentioned above, and with the left hand half as shown in Fig. 7, the extension of the segments 8 is commenced thus forcing the band 2 toward or into the cavity 7. It is, however, necessary to connect, first of all, the two pairs of rings 5 and 6 with each other, for instance, by means of a screw rod (or rods) with inverse threads, so that one pair cannot approach the other unless desired, that is to say, unless said screw rod is turned upon its axis. When it is found that the band 2 has been stretched and forced outward a predetermined amount the action of the segments 8 is stopped, and the pair of rings 5 and 6 are caused to approach each other somewhat; then the movement outward of the segments 8 is set up again, and the rings are caused to approach more closely, until the machine is brought to the position shown to the right in Fig. 7, and the leather band is of the shape shown in Fig. 5. It is obvious that the apparatus shown in Fig. 7 may be varied in many ways, retaining, however, the same process of working. A simple means of performing the same work, consists for instance, in inclosing the rings 5 by means of hermetically sealed covers, making, so to speak, plain disks of them, and then to introduce into the chamber formed by these disks and the leather band a fluid under pressure, which would act in the same manner as the segments 8 to force the leather into the cavity 7.

As it may be advisable during the operation to maintain the leather at a relatively high temperature, the apparatus shown in Fig. 7 may be provided with a chamber 12, for the circulation of steam or hot water. From the shape shown in Fig. 5, it can be altered, as already stated, in an obvious manner to any type of definite shape, as for instance that of Fig. 6, and thus a leather tire may be obtained, which is of the same shape possesses the same properties, and can be applied direct to the wheel the same as india rubber tires, over which it possesses however, the advantage of greater resistance, greater durability and greater economy. For the purpose of further strengthening the tires, especially against any possibility of distortion, it may be useful to provide it internally with a layer of canvas of corresponding shape, which may be caused to adhere to the internal surface of the leather by any suitable means. The tire obtained in the manner described may also be adapted for use as a simple repair covering or for the strengthening of india rubber tires, being applied over the latter after previously doing away with the parts which are, in that case, superfluous, viz. the edges 4, 4, thus passing direct from the stage shown in Fig. 5 to the ultimate shape by simply cutting off the said edges 4, 4.

The material used in the process of manufacture described herein may be tanned, as already mentioned, at the first, but green leather may also be employed, and submitted to the tanning process after the work of shaping it has taken place. As it may also happen that for certain tires one layer or thickness of leather alone may not be sufficient, it may be useful to submit two or more layers to the shaping process simultaneously, producing thus a tire of multiple layers.

Having now particularly described and ascertained the nature of our said invention and in what manner the same is to be performed, we declare that what we claim is:

1. In the manufacture of leather tires or the like, the process which consists in first forming a sheet of leather into a seamless cylinder, and then bending the latter to cause the edges thereof to lie inwardly of the body portion.

2. In the manufacture of leather tires or the like, the process which consists in first forming a sheet of leather into a seamless cylinder, and then bending the latter to cause the edges thereof to lie inwardly of the body portion by stretching such body portion outwardly.

3. In the manufacture of leather tires or the like, the process which consists in first forming a sheet of leather into a seamless cylinder and then bending the latter to cause the edges thereof to lie inwardly of the body portion by stretching such body portion outwardly while progressively bringing such edges toward each other.

4. In the manufacture of leather tires or the like, the process which consists in first forming a seamless annular structure having cylindrical walls from a sheet of leather and then forming such structure into the shape of a tire.

5. In the manufacture of leather tires or the like, the process which consists in forming a sheet of leather into the form of a cylinder having a bottom, removing such bottom and forming such cylinder into tire shape.

6. In the manufacture of leather tires or the like, the process which consists in forming a sheet of leather into the form of a cylinder having a bottom, removing such bottom, and stretching the middle portion of such cylinder radially outward.

In witness whereof, we have hereunto signed our names in the presence of two subscribing witnesses.

GIACOMO DURIO.
ACHILLE DURIO.
GIOVANNI MARTINA.

Witnesses:
MARIO CAPUCCIO,
GOTTARDO C. PIRONI.